United States Patent
Weiss

(10) Patent No.: US 6,853,798 B1
(45) Date of Patent: Feb. 8, 2005

(54) DOWNHOLE GEOTHERMAL WELL SENSORS COMPRISING A HYDROGEN-RESISTANT OPTICAL FIBER

(75) Inventor: Jonathan D. Weiss, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 100 days.

(21) Appl. No.: 10/104,216

(22) Filed: Mar. 22, 2002

Related U.S. Application Data

(60) Provisional application No. 60/329,434, filed on Oct. 15, 2001.

(51) Int. Cl.[7] .................................................. G02B 6/00
(52) U.S. Cl. .......................... 385/142; 385/124; 385/12
(58) Field of Search ............................... 385/12, 13, 31, 385/141–145, 123–127, 143, 5, 38; 250/227.14

(56) References Cited

U.S. PATENT DOCUMENTS

| | | | | |
|---|---|---|---|---|
| 4,820,016 A | * | 4/1989 | Cohen et al. ................... 385/5 |
| 4,830,513 A | * | 5/1989 | Grego ......................... 374/131 |
| 5,210,816 A | * | 5/1993 | Iino et al. .................... 385/142 |
| 5,509,101 A | * | 4/1996 | Gilliland et al. ............. 385/142 |
| 5,681,365 A | * | 10/1997 | Gilliland et al. ............... 65/377 |
| 5,721,800 A | * | 2/1998 | Kato et al. ................... 385/127 |
| 5,732,178 A | * | 3/1998 | Terasawa et al. ........... 385/127 |
| 5,740,297 A | * | 4/1998 | Onishi et al. ................ 385/127 |
| 5,913,005 A | * | 6/1999 | Terasawa et al. ........... 385/127 |
| 6,130,981 A | * | 10/2000 | Nelson et al. ............... 385/128 |
| 6,271,766 B1 | * | 8/2001 | Didden et al. ........... 340/853.1 |
| 6,281,489 B1 | * | 8/2001 | Tubel et al. ........... 250/227.14 |
| 6,289,161 B1 | * | 9/2001 | Schotz et al. ................ 385/142 |
| 6,697,562 B1 | * | 2/2004 | Lee et al. .................... 385/142 |

OTHER PUBLICATIONS

26th Workshop on Geothermal Reservoir Eng., Stanford Univ., Stanford, CA, Jan. 29–31, 2001, (Proceedings) SGP–TR–168.

* cited by examiner

*Primary Examiner*—Joseph Williams
*Assistant Examiner*—Dalei Dong
(74) *Attorney, Agent, or Firm*—Robert D. Watson; Brian Dodson

(57) ABSTRACT

A new class of optical fiber based thermal sensors has been invented. The new sensors comprise hydrogen-resistant optical fibers which are able to withstand a hot, hydrogen-containing environment as is often found in the downhole well environment.

10 Claims, 2 Drawing Sheets

DOWNHOLE GEOTHERMAL WELL SENSORS COMPRISING A HYDROGEN-RESISTANT OPTICAL FIBER

CROSS-REFERENCE TO RELATED APPLICATIONS

This application is a nonprovisional application which claims priority from prior provisional U.S. patent application Ser. No. 60/329,434 filed on Oct. 15, 2001, and entitled A NEW OPTICAL FIBER FOR USE AT HIGH TEMPERATURE IN AN ENVIRONMENT CONTAINING HYDROGEN GAS.

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to temperature sensors, and in particular to a new class of optical fiber distributed temperature sensors suited to use in harsh, hydrogen-containing environments.

BACKGROUND OF THE INVENTION

One of the niche applications for fiber optics is distributed temperature sensing in geothermal wells. A temperature profile obtained shortly after drilling will determine the potential of a well for use in power generation, and provides guidance as to how to best harness heat generated by the well.

Additionally, long-term thermal monitoring of a power-producing geothermal well is needed to operate the well so that production of electric power is optimized. Additional water must periodically be re-injected into the well, resulting in localized cooling. Efficient operation of a geothermal well often requires that the re-injection point be moved to a hotter region of the well. It is well known in the art that a vertical temperature profile of an entire geothermal well can be obtained essentially instantaneously using a single optical fiber. As a result, use of an optical-fiber distributed temperature sensing system as a geothermal well logging tool is held to offer much potential.

The operating principles of a typical optical fiber distributed temperature sensor follow. When light of a frequency ($\omega$) interacts with a medium in which molecular or lattice vibration is taking place at a frequency $\omega_r$, said light will be Raman scattered from the medium. The scattered light will include frequencies of $\omega+\omega_r$ as well as the original frequency $\omega$. A portion of this scattered light propagates opposite to the propagation direction of the incident light, or is backscattered.

The intensity of the various frequency components of the backscattered light are found to depend on the temperature of the medium at the point where the backscattered light is generated. Accordingly, proper detection and analysis of the backscattered light in a medium allows one to determine the distribution of temperature in that medium.

In a prior art optical fiber distributed temperature sensor, a light of a known frequency is introduced into an optical fiber whose temperature distribution along its length is to be measured. The backscattered light is collected, and spectral analysis of the backscattered light is carried out using time domain techniques.

The result is a relationship between temperature of the backscattering medium and time. As the backscattering medium is part of the optical fiber, however, the time when the backscattered radiation is collected for analysis is directly related to the distance along the fiber where the backscattering medium is located. Thus, the relation between temperature and time can be easily converted into the desired relation between temperature and position along the fiber.

As mentioned before, use of an optical fiber distributed temperature sensor for monitoring and evaluation of geothermal wells is considered to be an attractive possibility in the art. For such use to be practical, however, requires that the optical fiber to be placed in the geothermal well can survive the harsh downhole environment for a period measured in years.

Field tests of optical fiber distributed temperature sensors in geothermal wells have demonstrated that conventional optical fibers are insufficiently robust for this type of application. In the hotter wells studies, anomalies associated with changes in the optical transmission characteristics of the optical fibers used were seen in as little as 24 hours. The optical fibers were rendered useless for the intended application within time periods far shorter than the required service life.

The transmission anomalies were found to relate to the formation of OH ions in the silicate glass matrix of the optical fibers. These OH ions did not exist in the optical fibers prior to their exposure to the downhole environment. The likely degradation mechanism is that hydrogen in the hot downhole environment diffuses into the fiber, and there reacts with the oxygen of the silicate glass to form OH ions.

The constituents of the glass are found to have a strong influence on the rate at which OH ions are formed in a typical downhole environment. Optical fibers typically have a core glass with a refractive index which is larger than that of a surrounding cladding glass. An optical fiber can have a step-index structure, where there is an essentially abrupt interface between the core and the cladding glasses, or can have a graded-index structure, where the properties of the fiber vary in a graded manner radially in the fiber.

A common usage is to introduce germanium to increase the core refractive index. It has been found, however, that the presence of germanium promotes the formation of OH ions in the downhole environment.

Phosphorous is also commonly added to the glass to improve manufacturing characteristics by reducing the viscosity of the molten glass. Phosphorous is found to promote the formation of OH ions to a greater extent than does germanium. Generally, then, commercially available optical fibers comprise materials which render them susceptible to hydrogen damage through OH ion formation.

The only solution to this problem which seems to have been explored by the geothermal industry is to introduce a hydrogen diffusion barrier at the surface of the optical fiber, to attempt to prevent diffusion of hydrogen into the fiber. Various barrier coatings, such as carbon, silicon oxynitride, and aluminum, have been investigated. Although such barrier coatings are found to be effective at low temperatures, their effectiveness largely disappears at higher temperatures, typically in excess of 250° C. As many geothermal applications involve exposure to environments hotter than this, such barrier coatings do not provide adequate protection for optical fiber distributed temperature sensors in geothermal applications.

Both phosphorous-free and germanium-free fibers have been tested in hot hydrogen-containing environments.

However, even a step-index fiber with a pure silica core exhibits unacceptable levels of OH ion formation.

It is commonly held in the geothermal industry that routine usage of optical fiber-based sensors, and in particular distributed temperature sensors, as downhole instrumentation in geothermal wells is highly desirable. Other types of fiber-optic-based downhole sensors, such as interferometric strain and tilt sensors, are also desirable for use in hot, hydrogen-containing environments, but are difficult to implement owing to OH ion formation in the optical fiber.

There therefore exists need for optical fiber-based sensors, and in particular for optical fiber distributed temperature sensors, which comprises an optical fiber sufficiently resistant to OH ion formation within the downhole environment that said fiber, and hence said sensor, has a service life of sufficient duration for the intended applications.

The present invention addresses this need by incorporating in an optical fiber-based sensor system, and in particular in an optical fiber distributed temperature sensor, a type of optical fiber having sufficient resistance to OH ion formation in the downhole environment.

An advantage of using such a hydrogen-resistant optical fiber is that the service life of the resulting distributed temperature sensor is greatly extended relative to that of prior art distributed temperature sensors.

This and other advantages of the process of the present invention will become evident to those skilled in the art.

SUMMARY OF THE INVENTION

A new class of optical fiber distributed temperature sensors has been developed for use in hydrogen-containing environments generally, and in the geothermal well environment specifically. These new sensors use a hydrogen-resistant optical fiber to probe the temperature profile of the downhole environment, and offer improved resistance to degradation of sensor performance due to hydrogen-induced changes in the optical fiber optical transmission characteristics.

DETAILED DESCRIPTION

Figure 1:
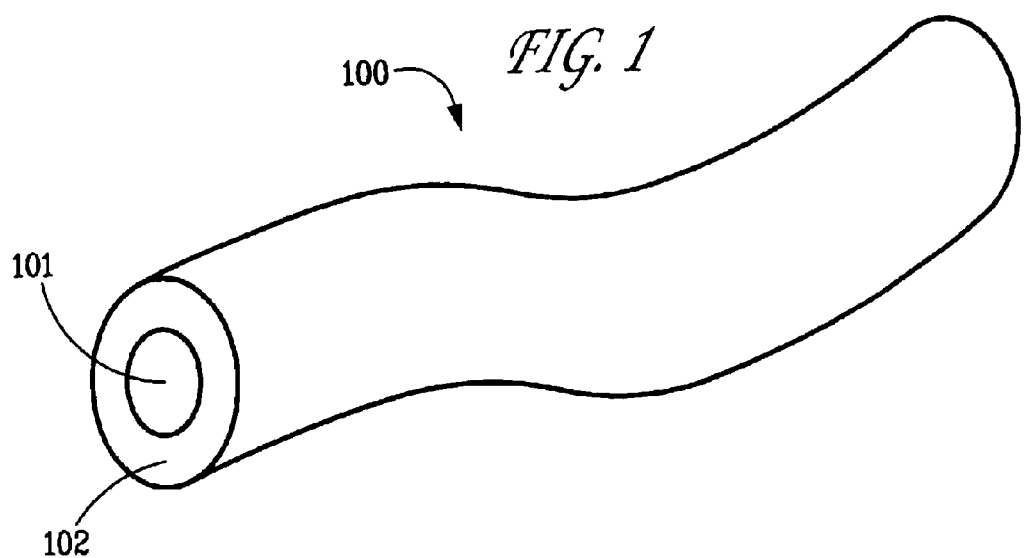
FIG. 1 shows a schematic illustration of a step-index optical fiber.

There are two common forms of optical fibers. FIG. 1 shows a step-index optical fiber, in which fiber 100 comprises a core region 101 which is surrounded by a cladding region 102. The fiber cross-sectional shape is typically circular, but other shapes are sometimes used for special applications.

The core region 101 has a core refractive index which is larger than is the cladding refractive index of the cladding region 102. In typical step-index optical fibers the core refractive index is constant throughout the core region 101, and the cladding refractive index is constant throughout the cladding region 102. However, light is confined primarily to the core region 101 through the existence of an abrupt change in refractive index at the interface between the core region 101 and the cladding region 102.

Figure 2:
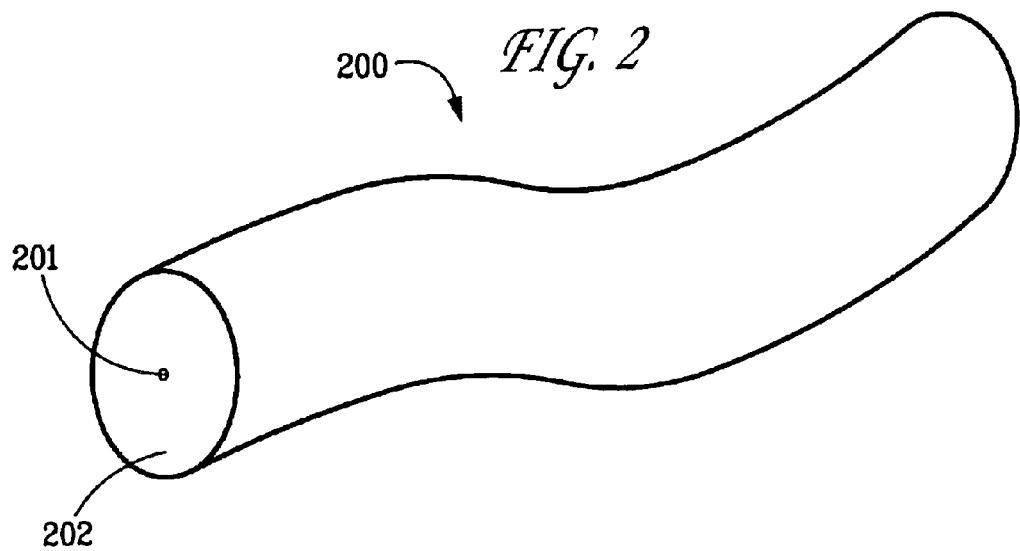
FIG. 2 shows a schematic illustration of a graded-index optical fiber.

An example of graded-index optical fibers is shown in FIG. 2. Here graded-index fiber 200 comprises an optical medium 201 distributed about an optical axis 202. Again, the fiber cross-sectional shape is typically circular.

Optical medium 201 is so fabricated that the refractive index thereof varies radially with distance from optical axis 202. This variation in refractive index is typically a monotonic decrease in refractive index with radial distance, with the largest refractive index appearing along optical axis 202. The variation in refractive index with radial distance is often chosen to be substantially parabolic in radial distance. However, all that is necessary for function of a graded-index optical fiber is that the variation in refractive index with radial distance be such that light is trapped within and transmitted along the optical fiber.

All types of optical fiber can in principle be used in an optical fiber distributed temperature sensor. However, step-index optical fibers have a narrow bandwidth relative to a graded-index fiber. As a result, optical pulses lengthen in a step-index fiber to a much greater extent than in a graded-index fiber. This pulse broadening is sufficient in a typical step-index fiber to degrade the spatial resolution of an optical fiber distributed temperature sensor to a level well below that potentially enabled by the temporal resolution of the light source, detectors, and analytical system.

Both types of optical fiber require spatial changes in refractive index. Optical fibers are typically fabricated by pulling a fiber from a preform. A preform for a step-index fiber is typically a cylinder having a central region composed of a core glass composition, and a cladding region composed of a cladding glass composition with a smaller refractive index than does the core glass composition.

In contrast, a preform for a graded-index fiber is typically a glass cylinder in which the concentration of one component of the glass varies radially within the cylinder. Such graded-index preforms are typically made using chemical vapor deposition, where the composition of the material being deposited is changed in a controlled manner as the preform is grown out radially from an initial core material.

The required variations in refractive index are the result of radial variations in the composition of the glass preform. A common avenue is to create a preform with large amounts of germanium near the axis of the preform, but smaller amounts or no germanium near the cylindrical surface of the preform. Such preforms are in common use for production of commercial optical fibers. However, as discussed earlier, the introduction of germanium to the optical fiber results in increased susceptibility to hydrogen-induced degradation.

Research was carried out nearly two decades ago on OH ion formation in optical fibers for undersea communication, where hydrogen degradation of optical transmission is also a factor for long-term application (H. Wehr and F. Weling, "Transmission Loss Behavior of PCVD Fibers in $H_2$ Atmosphere", Electronics Letters, Vol. 21, No. 19, Sep. 12, 1985, pgs 852–853, hereby incorporated by reference in its entirety). This research demonstrated that a test fiber containing fluorine showed no OH ion formation in a hydrogen-containing environment at 200° C.

Although the temperatures at which their research was carried out are well below those encountered in geothermal applications, the results of Wehr and Weling encourage, but do not establish or teach, the idea that use of fluorine-containing glasses in optical fibers intended for distributed temperature sensors in the downhole environment might be beneficial. However, despite the fact that optical fiber distributed temperature sensors were also developed in the mid-1980's, with an ongoing interest in their use in the geothermal environment since that time, a connection between this research result and distributed temperature sensors does not seem to have been made previously.

The inventor has tested a step-index fiber with a fused silica core and a cladding material whose refractive index was reduced relative to that of the fused silica core by introduction of fluorine. Although a small amount of transmission degradation by OH ion formation was observed at temperatures typical of the geothermal environment, this fiber outperformed all conventional fibers studied, whether protected by a diffusion barrier or not. This study confirms that such introduction of fluorine serves to greatly reduce OH ion formation in a hydrogen-containing environment at geothermal temperatures.

Introduction of fluorine into a silicate glass is known to reduce the refractive index thereof. As described earlier, the refractive index near the optical axis of an optical fiber must be larger than that of the optical medium near the cylindrical surface of the optical fiber. In addition, as the inventor has demonstrated that introduction of fluorine into the silicate glass is desirable to reduce or prevent OH ion formation in the geothermal environment, it is particularly desirable that fluorine be introduced into the core region of the silicate glass, where the majority of the optical power is concentrated.

Figure 3:
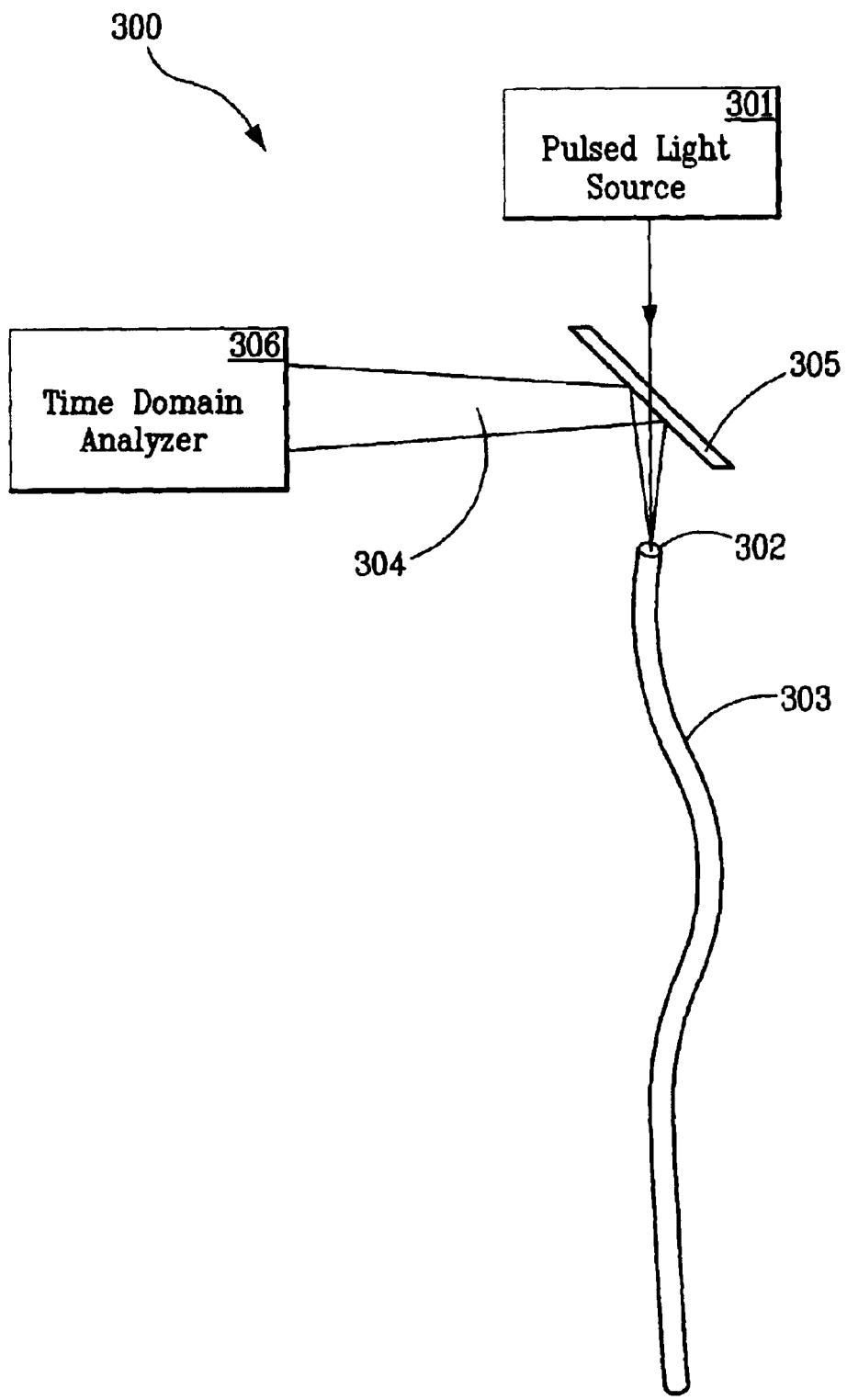
FIG. 3 shows a schematic illustration of an optical fiber distributed temperature sensor according to the present invention.

Taking the above factors into account, a specific implementation of the present invention appears in FIG. 3. Distributed temperature sensor 300 comprises a pulsed light source 301 which emits short pulses of light with a narrow bandwidth about a excitation frequency ω. Typically pulsed light source 301 comprises a pulsed laser having a pulse duration on the order of 10 nanoseconds in length, enabling a sensor spatial resolution of about a meter.

The output of pulsed light source 301 is directed into input 302 of hydrogen-resistant optical fiber 303, which is positioned so as to measure the desired temperature distribution. Backscattered light 304 emerges from input 302, and is directed by beamsplitter 305 into time domain analyzer 306.

Time domain analyzer 306 analyzes the spectral components of backscattered light 304 as a function of time elapsed since the pulse of light was emitted by pulsed light source 301, and uses the time-resolved spectral information to determine the distribution of temperature along the length of hydrogen-resistant optical fiber 303.

Hydrogen-resistant optical fiber 303 is so fabricated that it contains fluorine throughout the structure of the fiber. As discovered by the inventor, introduction of fluorine dramatically reduces OH ion formation in the geothermal environment.

In a specific set of implementations, fiber 303 is a graded-index fiber with fluorine distributed therein so that a large concentration of fluorine exists near the cylindrical surface, and the concentration of fluorine decreases near the optical axis of the fiber. In a particularly desirable implementation, the concentration of fluorine increases parabolically with radial distance from the optical axis. The glass into which fluorine is introduced to form 303 can be pure silica glass or a silicate glass. Chlorine can be introduced to reduce OH ion formation during manufacture of the fiber.

In an alternate implementation, fiber 303 takes the form of a step-index fiber. Such a step-index fiber can exhibit either single mode or multi-mode transmission, depending on the detailed construction thereof. A single mode optical fiber can enable interferometric applications, such as remote strain and tilt sensors. Here it is particularly beneficial that the core region contain fluorine, as the majority of the optical energy is concentrated in the core region. If a single fluorine-doped glass is used to make the fiber, this requires that the cladding region contains a larger concentration of fluorine than does the core region. If two different glasses are used, however, the cladding region need not contain fluorine.

The specific implementations of the present invention described above are intended only to illustrate various features of the present invention. The scope of the present invention is intended to be set by the claims in view of the specification.

What is claimed is:

1. A hydrogen-resistant, graded-index, optical fiber comprising a core having a central axis, said core consisting essentially of pure silica and fluorine; wherein the concentration of fluorine within the core increases as the radial distance from the central axis increases.

2. The hydrogen-resistant, rare-index, optical fiber of claim 1, wherein the concentration of said fluorine within the substantially varies parabolically with radial distance from the central axis.

3. A distributed temperature sensor system comprising:

a pulsed light source for emitting short pulses of light with a narrow bandwidth about an excitation frequency ω;

a hydrogen-resistant, graded-index, optical fiber comprising a core having a central axis, said core consisting essentially of pure silica and fluorine; wherein the concentration of fluorine within the core increases as the radial distance from the central axis increases, and having an input end; wherein said input end is disposed to receive pulses of light emitted from said pulsed light source;

a beamsplitter disposed in-between said light source and said input end of said fiber;

a time domain analyzer for analyzing, as a function of time elapsed since a pulse of light is emitted by said pulsed light source, the spectral components of backscattered light emitted by the input end of said fiber in response to said pulse of light impinging on said input end; wherein said beamsplitter is disposed to direct said backscattered light emitted from said input end into said time domain analyzer; thereby producing time-resolved spectral information;

wherein said time domain analyzer uses said time-resolved spectral information to determine the distribution of temperature along the length of said fiber.

4. The distributed temperature sensor system of claim 3, wherein the pulsed light source comprises a pulsed laser having a pulse duration on the order of 10 nanoseconds in length, thereby enabling a sensor spatial resolution of about a meter.

5. A hydrogen-resistant, graded-index, optical fiber comprising a core having a central axis, said core consisting essentially of pure silica, fluorine, and chlorine; wherein the concentration of fluorine within the core increases as the radial distance from the central axis increases.

6. A sensor system comprising an optical fiber-based sensor comprising a hydrogen-resistant, graded-index, optical fiber comprising a core having a central axis; said core consisting essentially of pure silica and fluorine; wherein the concentration of fluorine within the core increases as the radial distance from the central axis increases.

7. The sensor system of claim 6, wherein the optical fiber-based sensor comprises an optical fiber-based distributed temperature sensor system.

8. The sensor system of claim 6, wherein the optical fiber-based sensor comprises an interferometric sensor system.

9. The sensor system of claim 6, wherein the concentration of fluorine within the core of said fiber substantially varies parabolically with radial distance from the central axis increases.

10. A sensor system comprising an optical fiber-based sensor comprising a hydrogen-resistant, graded-index, optical fiber comprising a core having a central axis; said fiber core consisting essentially of pure silica, fluorine, and chlorine; wherein the concentration of fluorine within the core increases as the radial distance from the central axis increases.

* * * * *